US012385418B1

(12) United States Patent
Lee

(10) Patent No.: US 12,385,418 B1
(45) Date of Patent: Aug. 12, 2025

(54) RETAINING NUT WITH INTEGRATED OIL SCOOP

(71) Applicant: PRATT & WHITNEY CANADA CORP., Longueuil (CA)

(72) Inventor: Jeff Lee, Burlington (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/648,597

(22) Filed: Apr. 29, 2024

(51) Int. Cl.
*F01D 25/18* (2006.01)

(52) U.S. Cl.
CPC .......... *F01D 25/18* (2013.01); *F05D 2240/50* (2013.01); *F05D 2260/31* (2013.01); *F05D 2260/98* (2013.01)

(58) Field of Classification Search
CPC .. F01D 25/18; F05D 2240/50; F05D 2260/31; F05D 2260/98
See application file for complete search history.

(56) References Cited

U.S. PATENT DOCUMENTS

| | | | | |
|---|---|---|---|---|
| 6,579,010 | B2 | 6/2003 | Trapp et al. | |
| 10,047,649 | B2 | 8/2018 | Lucas | |
| 10,883,540 | B1 * | 1/2021 | Anglin .................... | F16C 41/00 |
| 11,781,446 | B2 | 10/2023 | Perdrigeon et al. | |
| 2022/0325753 | A1 | 10/2022 | Perdrigeon et al. | |

FOREIGN PATENT DOCUMENTS

| | | | |
|---|---|---|---|
| CN | 105370734 | B | 1/2018 |
| CN | 209398716 | U | 9/2019 |
| CN | 111022897 | A | 4/2020 |

* cited by examiner

*Primary Examiner* — Michael L Sehn
(74) *Attorney, Agent, or Firm* — NORTON ROSE FULBRIGHT CANADA LLP

(57) ABSTRACT

An oil supply system for an aircraft engine having a rotating shaft comprises a retaining nut including a unitary annular body having an outer surface and an inner surface extending around a central axis between a first end and a second end. The inner surface has a threaded portion at the second end. The threaded portion is configured for threaded engagement with a corresponding threaded portion of the rotating shaft. The outer surface of the unitary annular body includes a series of teeth distributed around the central axis of the retaining nut. The teeth are configured for engagement with a tightening tool. A first tooth of the teeth has a first radial oil scoop formed thereon. The first radial oil scoop defines an oil passage extending from the outer surface to the inner surface of the nut at an axial location between the first end and the threaded portion.

20 Claims, 4 Drawing Sheets

RETAINING NUT WITH INTEGRATED OIL SCOOP

TECHNICAL FIELD

The application relates generally to aircraft engines and, more particularly, to lubricant supply systems.

BACKGROUND OF THE ART

Various parts of gas turbine engines are lubricated using a stream of lubricant fluid. The fluid has to be routed up to the very location where the lubrication or feeding is needed. In some applications, access to the part requiring lubrication may be challenging. While known lubricant supply systems have various benefits, there is still room in the art for improvement.

SUMMARY

In one aspect, there is provided system for an aircraft engine, comprising: a shaft rotatable about an axis, the shaft having an oil supply channel extending from a first axial location to a second axial location, and a threaded portion axially overlapping the oil supply channel; a bearing rotatably supporting the shaft, the bearing having an inner race mounted to the shaft at the second axial location; and a retaining nut having a threaded portion and an oil channeling portion projecting axially from the threaded portion, the threaded portion of the retaining nut threadedly engaged with the threaded portion of the shaft, the oil channeling portion circumscribing an oil annulus between the retaining nut and the shaft at the first axial location, the oil annulus fluidly connected to the inner race of the bearing via the oil supply channel of the shaft, the oil channeling portion including a first oil scoop defining an oil supply passage extending from a radially outer surface to a radially inner surface of the retaining nut, the oil supply passage fluidly connected to the oil annulus.

In another aspect, there is provided an oil supply system for an aircraft engine having a rotating shaft, the oil supply system comprising: a retaining nut including a unitary annular body having a radially outer surface and a radially inner surface extending around a central axis between a first axial end and a second axial end opposite to the first axial end, the radially inner surface having a threaded portion at said second axial end, the threaded portion of the retaining nut configured for threaded engagement with a corresponding threaded portion of the rotating shaft of the aircraft engine, the radially outer surface of the unitary annular body including a series of teeth distributed around the central axis of the retaining nut, the teeth configured for engagement with a tightening tool, a first tooth of the series of teeth having a first radial oil scoop formed thereon, the first radial oil scoop defining an oil passage extending from the radially outer surface to the radially inner surface of the unitary annular body at an axial location between the first axial end and the threaded portion.

In a further aspect, there is provided an oil scoop system for capturing oil sprayed by an oil nozzle and feed the oil to a bearing of an aircraft engine, comprising: a shaft rotatably supported by the bearing for rotation about an axis, the shaft having: oil supply channels defined at circumferentially spaced-apart locations in a radially outer surface of the shaft, the oil supply channels extending from a first axial location to a second axial location where the bearing is located; and outer threads defined in the radially outer surface, the outer threads axially overlapping the oil supply channels; and a retaining nut having a unitary annular body extending around a central axis, the unitary annular body having a radially outer surface and a radially inner surface extending axially between a first axial end and a second axial end, the radially inner surface having inner threads at the second axial end, the inner threads of the retaining nut threadedly engaged with outer threads of the shaft over the oil supply channels, the radially outer surface having a series of teeth formed thereon around the central axis, the series of teeth configured for engagement with a tightening tool to tighten the retaining nut at a predetermined torque on the shaft, a first tooth of the series of teeth having a first oil scoop formed thereon, the first oil scoop defining a first oil supply passage radially through the unitary annular body at an axial location between the first axial end and the inner threads, the first oil supply passage in fluid communication with the oil supply channels of the shaft to feed oil scooped by the first oil scoop to the bearing.

The term "oil" is herein broadly used to encompass all equivalent lubricant fluids.

DESCRIPTION OF THE DRAWINGS

Reference is now made to the accompanying figures in which.

DETAILED DESCRIPTION

In accordance with various aspects of the disclosure, apparatuses, systems and methods are described for providing one or more oil scoops to feed oil to components (e.g., bearings) disposed in crowed environment where little or no direct access is available to feed oil to the components. As will be seen hereinafter, according to some aspects of the disclosure, the oil is fed radially inwardly through a retaining nut used to axially secure one or more components in place within a rotor assembly. By so combining two functions into one part, it is possible to save space and provide for a more axially compact oil supply system.

Figure 1:
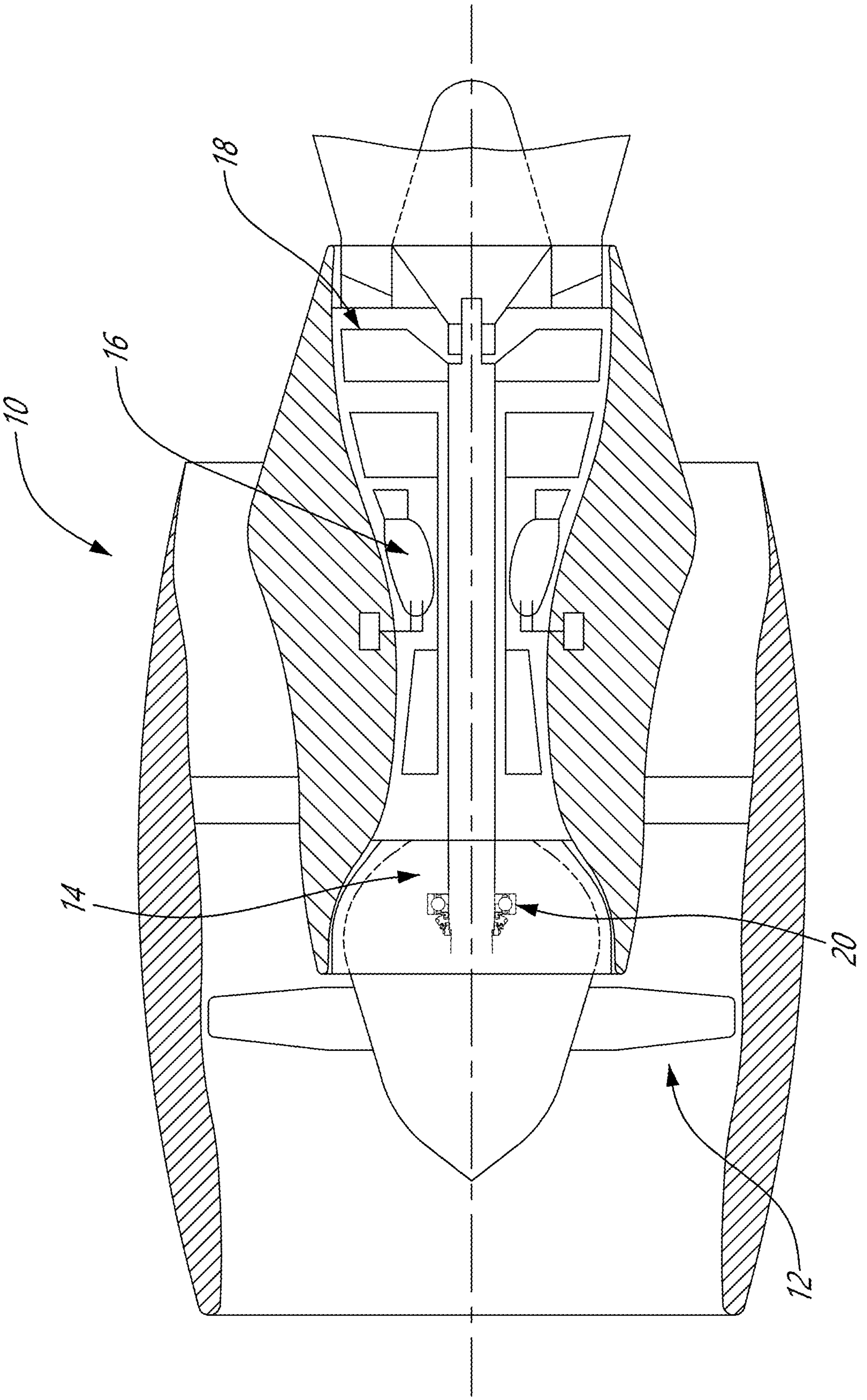
FIG. 1 is a schematic axial cross section view of an aircraft engine.

Aspects of the disclosure may be applied in connection with an engine of an aircraft, such as for example a multi-spool gas turbine engine. FIG. 1 illustrates an example of such an aircraft engine. More particularly, FIG. 1 illustrates a turbofan engine 10 generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The rotor assemblies (e.g., the low- and high-pressure spools) of the engine 10 are supported by a number of bearings that must be suitably lubricated during operation. FIG. 1 illustrates an example of a bearing assembly 20 forming part of a rotor assembly in the compressor section 14 of the engine 10. However, this is one exemplary location only and it should not be considered limiting as various alternate locations may house such a bearing structure.

Figure 2:
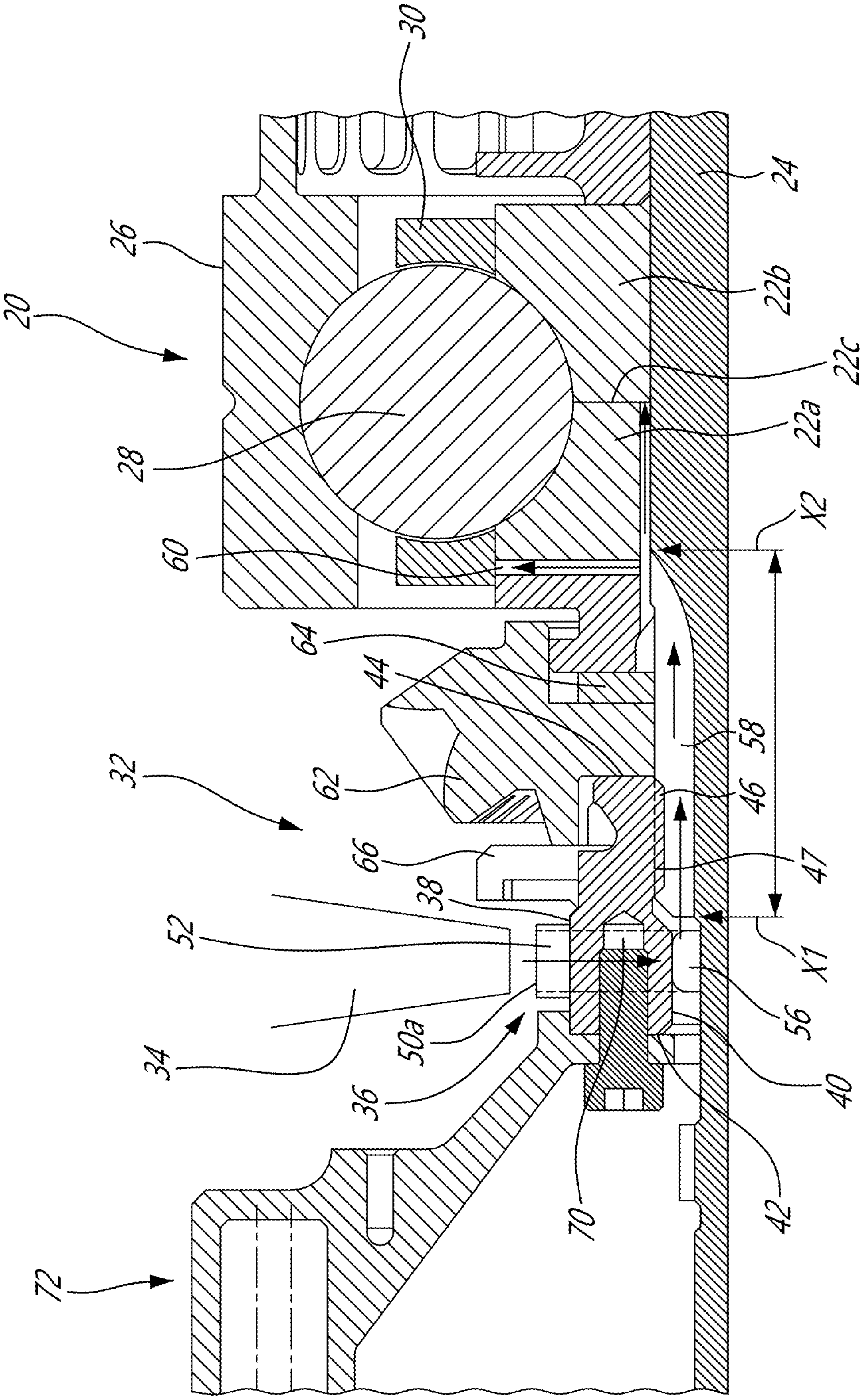
FIG. 2 is an axial cross section view of a bearing assembly and a bearing lubrication system included in the aircraft engine shown in FIG. 1, the lubrication system comprising a retaining nut integrated with radial oil scoops to feed oil to a bearing of the bearing assembly.

As detailed in FIG. 2, the exemplified bearing assembly 20 generally comprises an inner race 22*a*, 22*b* mounted to a rotor shaft 24 (e.g., the high pressure shaft of the high pressure spool), an outer race 26 mounted to a stationary structural element (not shown), a plurality of circumferentially distributed bearing elements 28 (e.g., ball bearings) in rolling contact therebetween, and a bearing cage 30 for retaining the bearing elements 28 in place. In one or more embodiments, the inner race 22*a*, 22*b* is a split race and includes a first half 22*a* and a second half 22*b*. The inner race first and second halves 22*a* and 22*b*, are axially butted together at a radial center split line 22*c*.

As mentioned herein above, the engine bearings, such as the exemplary bearing assembly 20, require proper lubrication during engine operation. As speeds rise, centrifugal forces increase, and it becomes more difficult for oil targeted directly at the bearing. Consequently, in high duty conditions (high speeds, loads and operating temperatures) to ensure the oil flow to the bearings is effective and efficient, under-race lubrication is often preferred. Under-race lubrication presents several advantages for higher speed applications, but in a confined space there may not be sufficient axial access for an oil nozzle or jet to target the under-race location directly and in such case it is desirable to supply the oil at a different axial location to that of the feed and to then axially transport the oil where lubrification is needed. In such cases, a rotating scoop device can be provided to capture a charge of lubricant and to deliver the captured lubricant to the bearing as an under-race feed.

The need for increased compactness leads to more crowded components making an appropriate and effective lubrication system challenging. In that context, one of the challenges the designers are face with is how to provide under race lubrication for these bearings and ensure proper lubrication to multiple parts while balancing the extremely tight confines of the turbine engine area.

FIG. 2 illustrates an example of an oil scoop system 32 for capturing oil sprayed by one or more oil nozzles 34 (only one shown) and feed the oil to the bearing assembly 20 of the engine 10. As will be seen hereinafter, the system 32 generally comprises an oil scoop arrangement integrated with a retaining nut 36 configured to withstand high torque for intentionally stretching the shaft 24 by applying a torque to maintain tension on the rotor assembly during thermal expansion. By integrating oil scoops to the retaining nut 36, oil can be fed to the bearing assembly 20 radially inwardly through the retaining nut 36, thereby eliminating the need to add an extra oil scoop structure on the shaft 24. This allows to save axial space. It enables to have an oil supply system in locations where there is otherwise no space available to install oil supply components.

Figure 3:
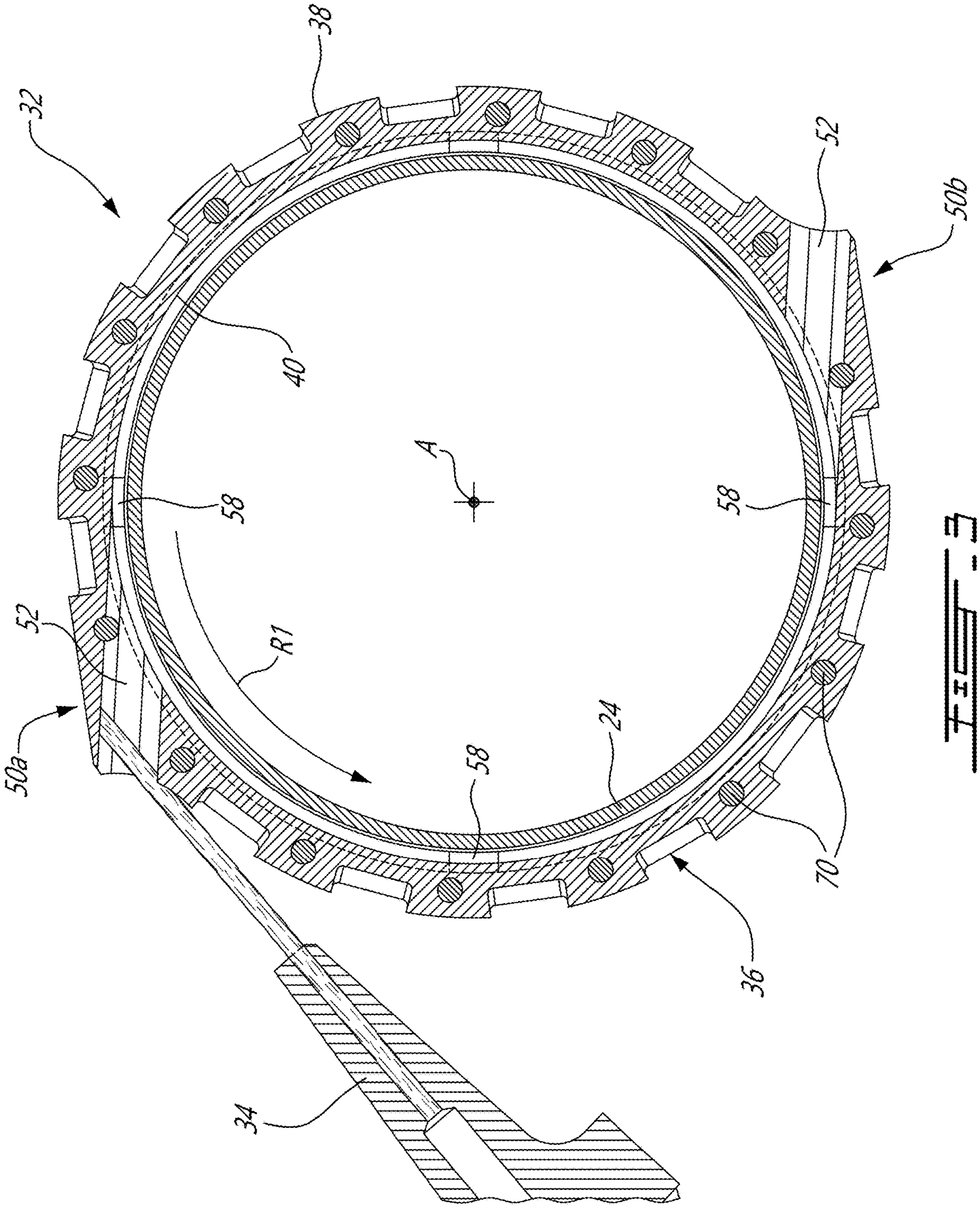
FIG. 3 is a cross-sectional end view illustrating the retaining nut and its integrated oil scoops mounted to the rotating shaft supported by the bearing to be lubricated.
Figure 4:
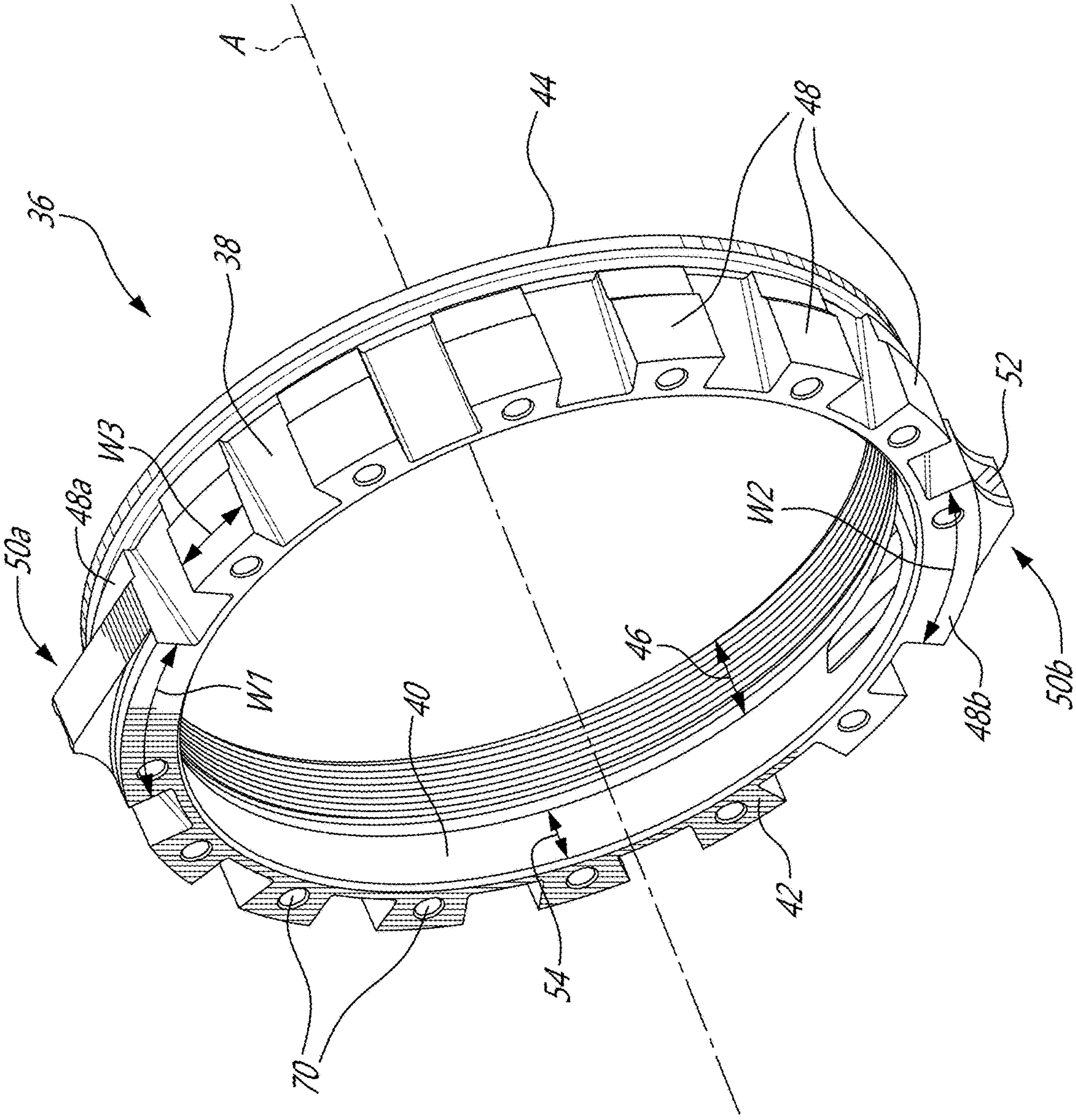
FIG. 4 is an isometric view of the retaining nut with its integrated radial oil scoops.

Referring concurrently to FIGS. 2-4, it can be appreciated that the retaining nut 36 is provided in the form of a unitary annular body having a radially outer surface 38 and a radially inner surface 40 extending around a central axis A between a first axial end 42 and a second axial end 44 opposite to the first axial end 42. The radially inner surface 40 has a threaded portion 46 at the second axial end 44. The threaded portion 46 has inner threads for threaded engagement with corresponding outer threads of a mating threaded portion 47 defined in an outer diameter surface of the shaft 24 of the aircraft engine 10. The radially outer surface 38 of the nut 36 includes a series of teeth 48 distributed around the central axis A. The teeth 48 are configured for engagement with corresponding teeth of a tightening tool (not shown) to tighten the nut 36 at a predetermined torque on the shaft 24. As shown in FIGS. 2 and 3, one or more radial oil scoops 50*a*, 50*b* (two in the illustrated example) are integrally formed with the unitary body of the retaining nut 36 to capture the oil sprayed by the oil nozzle 34 as the retaining nut 36 rotates together with the shaft 24. According to the illustrated embodiment, a first oil scoop 50*a* is provided atop of a first tooth 48*a* of the series of teeth 48 and a second oil scoop 50*b* is provided atop of a second tooth 48*b* of the series of teeth 48, the first and second teeth 48*a*, 48*b* being diametrically opposed to one another. However, it is understood that the relative position of the scoops and the number of scoops could be different depending on the intended application. Each of the first and second scoops 50*a*, 50*b* projects radially outwardly from the radially outer surface of their respective teeth 48*a*, 48*b* so as to define oil passages 52 extending from the radially outer surface 38 to the radially inner surface 40 of the retaining nut 36 at an axial location between the first axial end 42 and the threaded portion 46. As can be appreciated from FIGS. 2 and 3, a width W1, W2 of the first and second teeth 48*a*, 48*b* in a circumferential direction is greater than a width W3 of the remaining teeth 48 (the ones that have no scoops thereon). By so increasing the size of the first and second teeth 48*a*, 48*b*, the first and second scoops 50*a*, 50*b* can be appropriately configured to capture and guide the oil jet discharged from the oil nozzle 34. As can be appreciated from FIG. 3, the oil passage 52 of each scoop 50*a*, 50*b* is angularly oriented relative to the annular body of the retaining nut 36 so as to have a tangential component and a radial component to scoop the oil radially inwardly as the retaining nut 36 rotates with the shaft 24 in the rotation direction R1. It is understood that the orientation, shape and configuration of the oil supply passages 52 can vary to accommodate various needs. Likewise, the location, the orientation of the oil nozzle 34 relative to the scoops 50*a*, 50*b*, and the number of nozzles can be optimized for efficiency. The skilled person will also understand that that oil targeting, size, and flow supply are other customizable parameters to achieve optimal performance.

Referring to FIGS. 2 and 4, it can be appreciated that the oil supply passages 52 of the scoops 50*a*, 50*b* are positioned axially outside of the threaded portion 46 of the retaining nut 36. The oil passages 52 form part of an oil channeling portion 54 extending axially from the threaded portion 46 to the first axial end 42 of the retaining nut 36. The oil channeling portion 54 has a smooth inner diameter surface circumscribing a radial gap, herein an oil annulus 56, between the retaining nut 36 and the shaft 24. The oil captured by the scoops 50*a*, 50*b* is fed radially inwardly into this oil annulus 56 before being axially channeled to the bearing assembly 20 via an oil supply channel 58 extending axially along the shaft 24 from a first axial location X1 to a second axial location X2 underneath the bearing inner race 22*a*, 22*b*. According to some embodiments and as shown in FIG. 3, the oil supply channel 58 is provided in the form of axially extending grooves circumferentially distributed in the outer diameter surface of the shaft 24. The axially extending grooves are fed via the oil annulus 56, which acts as a manifold to provide uniform oil distribution between the axially extending grooves. As can be appreciated from FIG. 2, the outer threaded portion 47 of the shaft 24 axially overlaps the axially extending grooves and the oil annulus 56 is positioned at the end of the threaded portion 46 axially next to the inlet end of the axially extending grooves. This ensures that the oil supply passages 52 of the scoops 50*a*,

50*b* is in fluid communication with the axially extending grooves via the annulus 56 irrespectively of the final angular position of the retaining nut 36 after the same has been tightened to the desired torque on the shaft 24. The outlet end of the axially extending grooves of the shaft 24 is fluidly connected to radial holes 60 extending through the first half 22*a* of the bearing inner race and to the radial split 22*c* between the first and second halves 22*a*, 22*b* of the inner race, thereby providing for under race lubrification via the retaining nut 36 of the rotor assembly.

As shown in FIG. 2, intervening rotor assembly components are mounted to the shaft 24 over the axially extending grooves between the bearing assembly 20 and the retaining nut 36. The intervening rotor assembly components are axially clamped between the retaining nut 36 and the bearing assembly 20. For instance, the intervening rotor components may include a bevel gear 62 and a spacer 64. The second axial end 44 of the retaining nut 36 axially abuts against an opposed axial face of the bevel gear 62. The bevel gear 62 and the spacer 64 cooperate with the threaded portion 46 of the retaining nut 36 to cover the axially extending grooves of the shaft 24 between axial locations X1 and X2 to thereby form the shaft axial oil supply channels 58. A lock ring 66 is engaged with the teeth 48 of the retaining nut 36 for preventing loosening of the retaining nut 36 after it has been appropriately torqued to secure the various components (e.g., bevel gear 62, spacer 64 and bearing 20) in place within the rotor assembly. The teeth 48 are thus used for both torquing and locking purposes.

Referring to FIGS. 2-4, it can be appreciated that a circumferential array of bolt holes 70 are defined in the first axial end 42 of the retaining nut 36, the bolt holes 70 extending axially through the teeth 48 for allowing equipment, such as telemetry instruments 72, to be mounted to retaining nut 36.

In operation, oil is directed towards the retaining nut 36 on a trajectory dictated by the nozzle orientation, with the nozzle axis mounted at an angle to direct a jet of oil generally tangentially to the outer diameter of the retaining nut 36 as illustrated in FIG. 3. As the retaining nut 36 rotates at high speed with the shaft 24 in rotation direction R1, the radial oil scoops 50*a*, 50*b* on the retaining nut 36 capture a portion of the oil jet and draw the captured oil radially inwardly through the retaining nut 36 into the annulus 56 between the nut 36 and the shaft 24. From the annulus 56, which acts as a manifold, the captured oil is directed axially through the oil supply channels 58 defined in the shaft 24 to the axial location X2 underneath the bearing inner race 22*a*, 22*b*, thereby providing for an under-race bearing oil feed.

From the foregoing, it can be appreciated that the present technology provides a one-piece solution saving space while providing the requisite function of providing oil to rotor shaft bearings. More particularly, combining the functions of a retaining nut and radial oil scoops into one part allows to address limited space constraints, while simplifying the assembly of the rotor assembly.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while the bearing lubrication system has been described in the context of a compressor section of a turbofan engine, it is understood that the compressor section of a turbofan engine is used only as an example. Indeed, the bearing lubrication system could be used in a wide variety of engine types and in various sections of such engines. Yet further modifications could be implemented by a person of ordinary skill in the art in view of the present disclosure, which modifications would be within the scope of the present technology.

The invention claimed is:

1. A system for an aircraft engine, comprising:

a shaft rotatable about an axis, the shaft having an oil supply channel extending from a first axial location to a second axial location, and a threaded portion axially overlapping the oil supply channel;

a bearing rotatably supporting the shaft, the bearing having an inner race mounted to the shaft at the second axial location; and a retaining nut having a threaded portion and an oil channeling portion projecting axially from the threaded portion, the threaded portion of the retaining nut threadedly engaged with the threaded portion of the shaft, the oil channeling portion circumscribing an oil annulus between the retaining nut and the shaft at the first axial location, the oil annulus fluidly connected to the inner race of the bearing via the oil supply channel of the shaft, the oil channeling portion including a first oil scoop defining an oil supply passage extending from a radially outer surface to a radially inner surface of the retaining nut, the oil supply passage fluidly connected to the oil annulus.

2. The system of claim 1, wherein circumferentially spaced-apart teeth are provided on the radially outer surface of the retaining nut, the circumferentially spaced-apart teeth configured for engagement with a tightening tool, and wherein the first oil scoop is formed on a first tooth of the circumferentially spaced-apart teeth.

3. The system of claim 2, wherein a width of the first tooth in a circumferential direction of the retaining nut is greater than that of an adjacent one of the circumferentially spaced-part teeth.

4. The system of claim 2, wherein the first oil scoop extends radially outward from a radially outer surface of the first tooth of the circumferentially spaced-apart teeth.

5. The system of claim 2, wherein at least some of the circumferentially spaced-apart teeth have axial holes defined therein for mounting telemetry equipment to the retaining nut.

6. The system of claim 2, wherein a lock ring is engaged with at least some of the circumferentially spaced-apart teeth to prevent loosening of the retaining nut, the lock ring disposed axially between the first and second axial locations.

7. The system of claim 1, wherein intervening rotor assembly components are mounted to the shaft between the bearing and the retaining nut, the intervening rotor assembly components axially clamped between the retaining nut and the bearing.

8. The system of claim 7, wherein the intervening rotor assembly components comprise a bevel gear mounted for rotation with the shaft, and wherein the retaining nut axially abuts against the bevel gear.

9. The system of claim 1, wherein the oil supply channel comprises a plurality of axially extending grooves circumferentially distributed in an outer diameter surface of the shaft.

10. The system of claim 1, wherein the oil channeling portion of the retaining nut comprises at least one additional oil scoop.

11. An oil supply system for an aircraft engine having a rotating shaft, the oil supply system comprising: a retaining nut including a unitary annular body having a radially outer surface and a radially inner surface extending around a central axis between a first axial end and a second axial end opposite to the first axial end, the radially inner surface having a threaded portion at said second axial end, the threaded portion of the retaining nut configured for threaded engagement with a corresponding threaded portion of the rotating shaft of the aircraft engine, the radially outer surface of the unitary annular body including a series of teeth distributed around the central axis of the retaining nut, the teeth configured for engagement with a tightening tool, a first tooth of the series of teeth having a first radial oil scoop formed thereon, the first radial oil scoop defining an oil passage extending from the radially outer surface to the radially inner surface of the unitary annular body at an axial location between the first axial end and the threaded portion.

12. The oil supply system of claim 11, wherein a second radial oil scoop is formed on a second tooth of the series of teeth.

13. The oil supply system of claim 12, wherein the first and second radial oil scoops are disposed on diametrically opposed sides of the retaining nut.

14. The oil supply system of claim 11, wherein the first tooth has a first width in a circumferential direction about the central axis, wherein another tooth of the series of teeth has a second width in the circumferential direction, and wherein the first width is greater than the second width.

15. The oil supply system of claim 11, wherein an array of bolt holes is defined in the first axial end of the unitary annular body, the bolt holes extending axially through the series of teeth.

16. An oil scoop system for capturing oil sprayed by an oil nozzle and feed the oil to a bearing of an aircraft engine, comprising:

a shaft rotatably supported by the bearing for rotation about an axis, the shaft having:

oil supply channels defined at circumferentially spaced-apart locations in a radially outer surface of the shaft, the oil supply channels extending from a first axial location to a second axial location where the bearing is located; and outer threads defined in the radially outer surface, the outer threads axially overlapping the oil supply channels; and a retaining nut having a unitary annular body extending around a central axis, the unitary annular body having a radially outer surface and a radially inner surface extending axially between a first axial end and a second axial end, the radially inner surface having inner threads at the second axial end, the inner threads of the retaining nut threadedly engaged with outer threads of the shaft over the oil supply channels, the radially outer surface having a series of teeth formed thereon around the central axis, the series of teeth configured for engagement with a tightening tool to tighten the retaining nut at a predetermined torque on the shaft, a first tooth of the series of teeth having a first oil scoop formed thereon, the first oil scoop defining a first oil supply passage radially through the unitary annular body at an axial location between the first axial end and the inner threads, the first oil supply passage in fluid communication with the oil supply channels of the shaft to feed oil scooped by the first oil scoop to the bearing.

17. The oil scoop system of claim 16, wherein a width of the first tooth in a circumferential direction is greater than that of an adjacent tooth of the series of teeth.

18. The oil scoop system of claim 16, wherein a gap is defined radially between the radially inner surface of the unitary annular body of the retaining nut and the radially outer surface of the shaft at a location upstream of the oil supply channels relative to a flow of oil therethrough, the oil supply channels in flow communication with the gap to receive the oil scooped by the first oil scoop.

19. The oil scoop system of claim 18, wherein the first oil supply passage of the first oil scoop leads to the gap between the shaft and the retaining nut.

20. The oil scoop system of claim 16, wherein an array of bolt holes is defined in the first axial end of the unitary annular body, the bolt holes extending axially through the series of teeth.

* * * * *